Aug. 23, 1927.

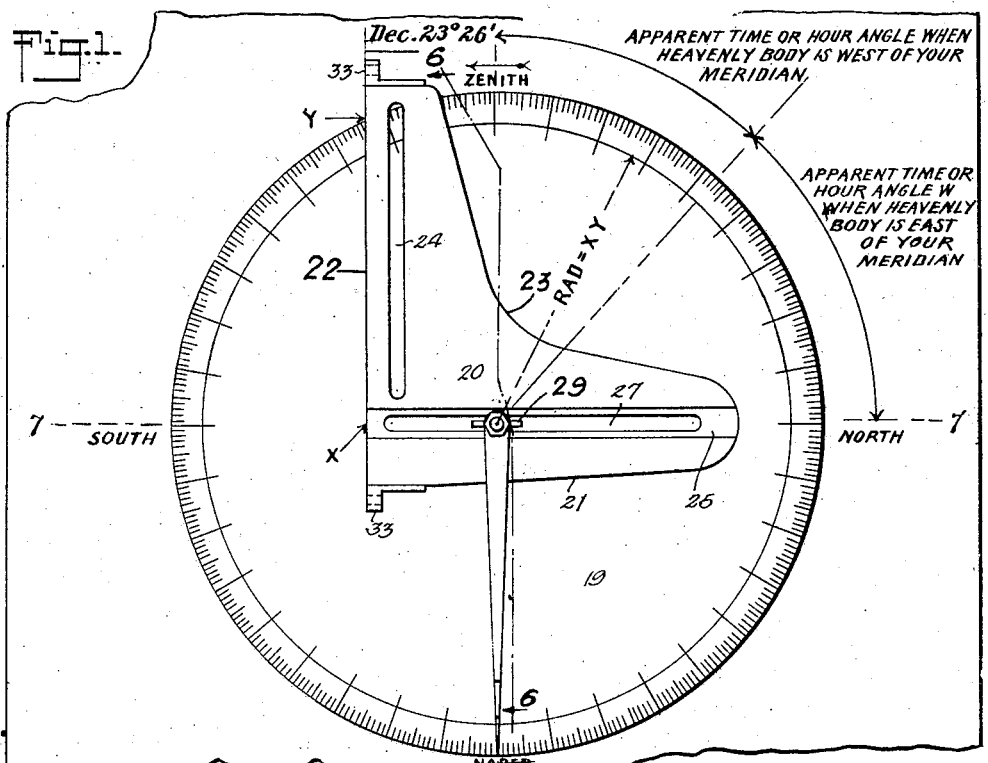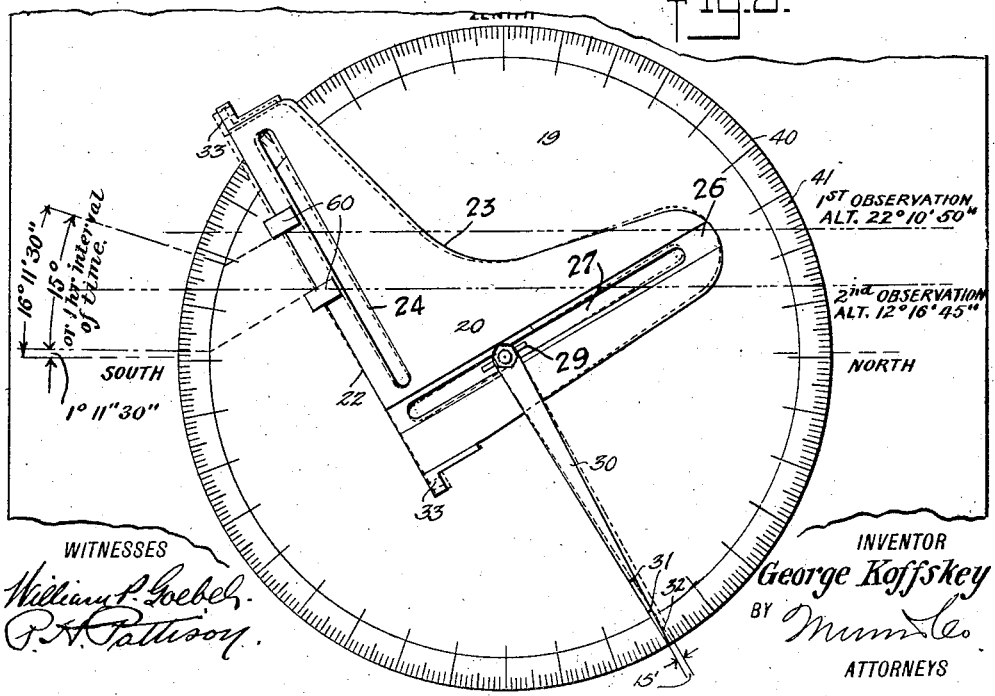

G. KOFFSKEY 1,640,328

NAUTICAL INSTRUMENT

Filed Jan. 8, 1924

WITNESSES
William P. Goeber.
P. H. Pattison.

INVENTOR
George Koffskey
BY
ATTORNEYS

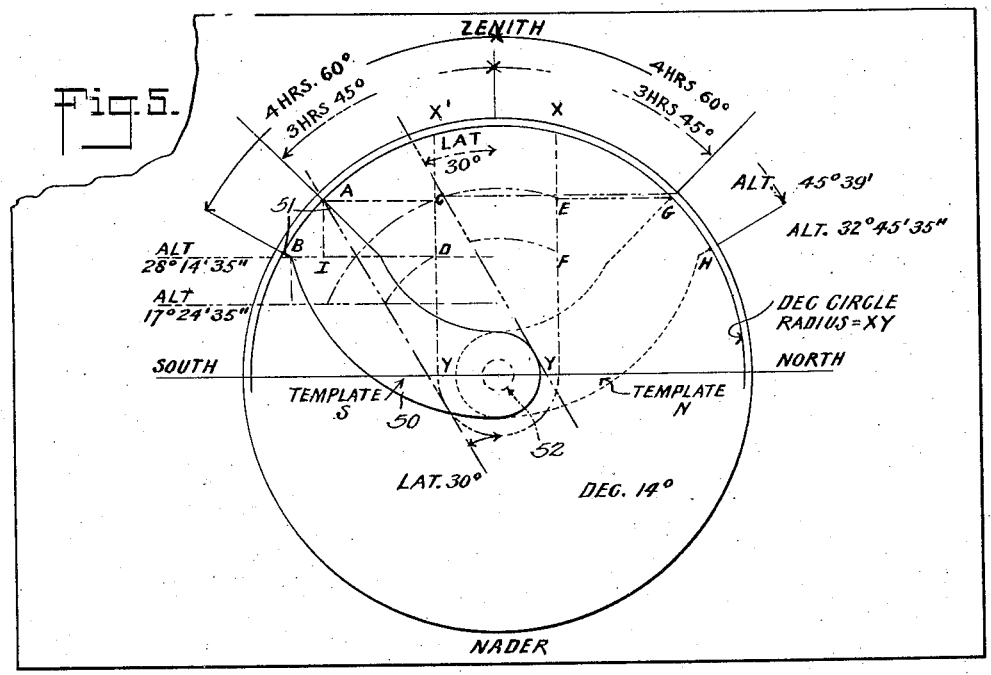
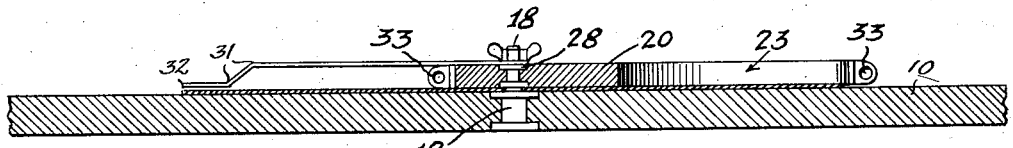
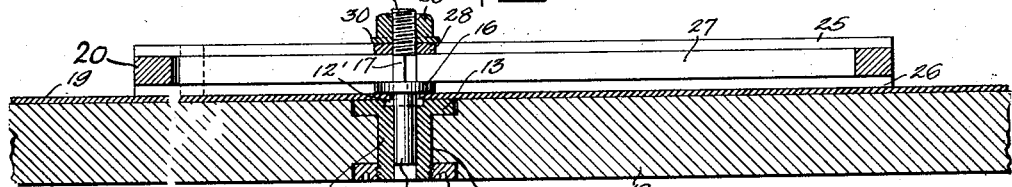
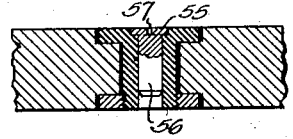

Patented Aug. 23, 1927.

1,640,328

UNITED STATES PATENT OFFICE.

GEORGE KOFFSKEY, OF NEW ORLEANS, LOUISIANA.

NAUTICAL INSTRUMENT.

Application filed January 8, 1924. Serial No. 685,031.

The present invention relates to new and useful improvements in nautical instruments, and it pertains more particularly to means for determining positions of ships at sea or locations on land with especial respect to latitudes.

It is one of the objects of the present invention to provide a means whereby the latitude position of an object either at sea or on land may be easily determined by a simpler method than the ones at present commonly employed.

It is a further object of the invention to provide an instrument to determine latitude and longitude position, using as a basis observations of one of the heavenly bodies and the interval of time between observations.

With the above and other objects in view, reference is had to the accompanying drawings, in which Figure 1 is a top plan view of one form of the invention;

Fig. 2 is a top plan view showing the parts in an adjusted position;

Fig. 5 is a top plan view showing the use of the attachment in the form of a templet;

Fig. 6 is a detail sectional view taken on the line 6—6 of Fig. 1;

Fig. 7 is a sectional view taken on a slightly enlarged scale, and on the line 7—7 of Fig. 1;

Fig. 8 is a detail sectional view on an enlarged scale of the center bushing or bearing of the device.

Figure 3:
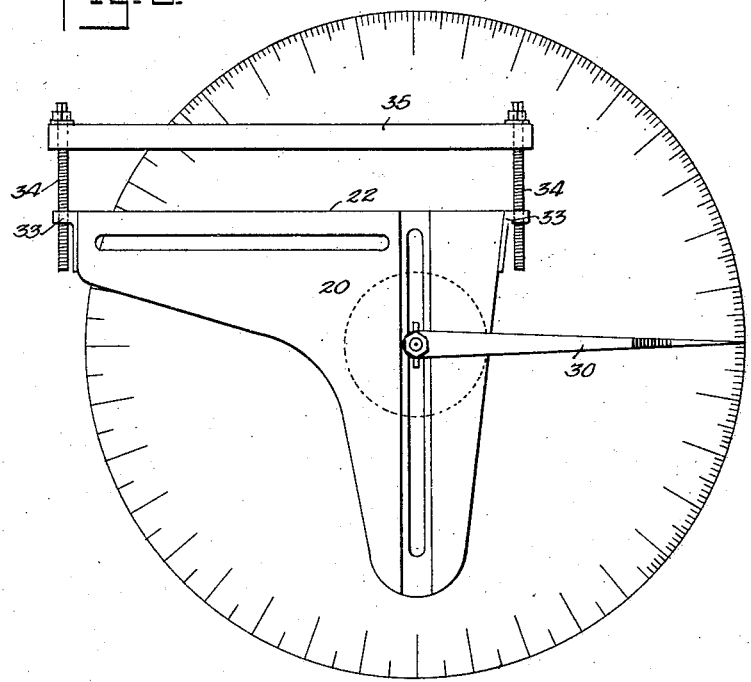
Fig. 3 is a top plan view of the invention showing an attachment used therewith.

Referring more particularly to the drawings, the device comprises a board 10, and such board is provided with an opening 11. Mounted in the opening 11, there is a bushing 12, one end of which is flanged as at 13, the other end being screw-threaded to receive a nut 14, by means of which the bushing is secured to the board 10. The flange 13 and the nut 14 are countersunk in order that they may be flush with their respective sides of the board 10.

The reference numeral 15 (Fig. 7) designates a pintle or stub shaft adapted to be received within the bushing 12, and said stub shaft has a flange 16, a squared portion 17 and a threaded end 18. The flange 16 of the pintle or stub shaft 15 is adapted to rest upon the top of the board or rather upon a paper or other memorandum surface 19, which in turn is supported on the top face of the board.

Mounted upon the squared portion 17 of the pintle or stub shaft 15, there is a substantially triangle-shaped member 20, having an angular side 21, a straight side 22, and a curved side 23. Extending parallel with the straight side 22, there is an elongated slot 24, and arranged at right angles to said slot and extending along the angular side 21, there are grooves 25 and 26 (Figure 7), the groove 25 being on the top face of the triangular member 20, while the groove 26 (Fig. 7) is on the lower face thereof. Extending through these grooves 25 and 26, there is a slot 27. The purpose of these slots 24 and 27 will be hereinafter more specifically described. The under groove 26 is adapted to receive the flange 16 of the pintle or stub shaft 15, and the upper groove 25 is adapted to receive a washer or the like, 28. Mounted on top of the washer 28 and secured thereon by means of a wing nut or the like, 29, there is an arm or pointer 30, and said arm or pointer 30 has its outer end bent downwardly, as shown at 31 (Figure 6), in order that the extremity 32 will lie in close relation to the writing surface or paper 19.

The member 20 is provided at each end of the straight side 22, with bearing blocks or the like, 33, and such bearing blocks 33 are internally screw-threaded for the reception of bolts 34. These bolts 34 carry a bar 35 shown in Figs. 3 and 4, and the bolts 34 by reason of their engagement with the bearings 33, form means by which the bar 35 is adjustable in parallel relation to the straight side 22 of the member 20. By this construction it is apparent that the member 20 is movable over the surface of the board or the writing surface 19, and that the arm or pointer 30 is movable over said surface, and the arm 30 and the member 20 are capable of independent movement or movement together, as the case may be. Furthermore, by this construction, the bar 35 is adjustable in parallel relation to the straight side 22 of the member 20, by means of the screws 34, as heretofore stated.

By reference to Figs. 1 and 2, it will be noted that the writing surface 19 comprises a sheet of paper, board, or the like, marked with a circle 40, calibrated as at 41, and dividing it into 360 degrees.

In Fig. 5 is shown a templet for use in lieu of the member 20, such templet comprising a curved member 50 having its outer end provided with straight edges 51. The templet is provided with a pin 52 at its inner end, which pin is adapted to be received in the bushing 12 when the templet is used in lieu of the member 20. The space between these straight edges 51 is the equivalent of 15 degrees or one hour on the circle heretofore mentioned as divided into 360 degrees, the purpose of which will be hereinafter described. The bushing member 12 has a recess 12' in its upper end, and such recess forms the means for receiving the head 55 of a pin or the like, 56, which is adapted to be received within the bushing member 12. This pin 56 has a centrally disposed recess 57, which forms means for receiving one leg of a compass or dividers in order that the same may be used over the writing surface 19, with the axial center of the bushing forming the pivotal point of such compass or dividers.

By reference to Fig. 2, it will be noted that the straight edge 22 of the member 20 is provided with two clips 60, such clips being adjustable along the straight edge 22 in a manner and for a purpose to be hereinafter specifically described.

The principle on which the more usual methods of finding the latitude depend will be understood from the following.

To an observer at the earth's equator, the celestial poles are in the horizon and the meridian point of the equator is in the zenith. If the observer travel northward over 1 degree of the meridian, the north celestial pole will appear 1 degree above the horizon while the meridian point of the equator will decline 1 degree southward, and so on until when he has reached the terrestrial pole, the pole of the heavens would be in the zenith and the celestial equator in the horizon. The same is true with regard to the Southern Hemisphere. It thus appears that to determine the latitude of a place we have only to find the elevation of the pole above the observer's horizon with pole corrected for position or the zenith distance of the meridian point to the equator. (The latitude of the equator is the complement of its altitude.) Where the observations are made morning or evening or east or west of the meridian and knowing the knots or miles run or differences of latitude made and the altitude scribed on writing surface 19, the instrument will show the increase or decrease of latitude by rotation and which can only be placed by the altitude and differences of time intervals when the observations were made.

As an aid to the navigator: The method of working the instrument for determining the time or hour angle from two observations of any heavenly body off the meridian any time day or night by taking the first observation and correcting the same for the change of ship's position to the time of the second observation, is as follows:

*First observation.*

Altitude corrected 22°—10′—50″. Greenwich apparent time 8 hrs.—55 mins.—14 secs. Ship's course NE. 4 points or angle 45°, the natural secant of which is 1.4142. The ship's run for one hour was 18,422 knots ÷1.4142=13.026 knots or change of 15 miles or minutes of latitude.

*Second observation.*

Altitude corrected 12°—16′—45″. Greenwich apparent time 9 hrs.—55 mins.—14 secs.

On the writing surface the altitude lines are scribed with the declination 23° 26′ south, and the triangular member placed in position as shown with the pointer at zero and the straight edge 22 coinciding with the declination line. Rotate the triangular member until the pointer shows an approximate latitude and place the clip as shown in Figure 2 on the first altitude line. Now rotate the triangular member increasing the latitude 15′ or ¼° due to change of ship's position. A set square placed against the straight edge 22 where it crosses the second altitude line and projected or squared over to divisions on the circle drawn with radius XY, at a glance will show the degree, and the set square placed against the clip will also show the degree. As the observations were made one hour, or sixty minutes apart, or 15°, the difference of degrees must show 15° for the pointer to indicate the correct latitude. If it does not show spaces or divisions equalling 15°, rotate the triangular member until you get the 15° division, then the pointer will indicate the latitude and time. It is to be remembered that every time the latitude is increased the clip must be placed on the first observation line before rotating the triangular member the 15 minutes or miles, the change in latitude due to the change of the ship's position.

The foregoing position of the triangular member 20 is determined as follows: Reference is had to Figure 1. The edge xy, previously referred to as the straight side 22, is placed parallel with the center line between zenith and nadir in a position 23° 26′ to the left as shown, this representing the ecliptic of the sun or other heavenly body at the time of observation. When the instrument is placed in position as described the thumb nut 29 is tightened so that the edge 22 cannot move from the declination line which it intersects at y as placed.

The particular declination selected is taken from the American Nautical Almanac for the day, hour and minute of Greenwich civil time at the time of taking the altitude of the heavenly body, and by subtracting 12 from this civil time it will agree with the time recorded on the ship's chronometer Greenwich mean time. The slot 27 is for the obvious purpose of permitting movement of the member 20 to any declination set off from the center line (zenith and nadir) either on the left or on the right side. When the sign of the declination is minus in the almanac the instrument is placed as shown in Figure 1.

But when the declination in the almanac shows positive the instrument is reversed, in other words the edge 22 will be disposed parallel to the zenith and nadir lines but 23° 26' to the right. The slot 27 permits shifting the triangular member 20 around as may be necessary, and the slot is purposely not cut through the ends of the member 20. The grooves 25 on each side accommodate the collar 16 and washer 28 (Fig. 7) of the pivot pin and permit the member 20 to lay flat upon the graduated sheet 19 when using the instrument.

The first observation was made at Greenwich apparent time 8 hrs., 55 mins., 14 secs., and we find by the triangular member (see Example 1 following) that the time at first observation was 2 hrs., 55 mins., 14 secs., which shows a longitude of 90°. 2 hrs., 55 mins.. 14 secs.=43°—48'—30". 90°—43°—48'—30"=46°—11'—30". 46°—11'—30"—30°=16°—11'—30" or latitude. The time of the second observation as found by the triangular member was 3 hrs., 55 mins., 14 secs., (see Example 2 following) which equals 58°—48'—30". 90°—58°—48'—30"=31°—11'—30". 31°—11'—30"—30° latitude=1°—11'—30". The difference of 16°—11'—30" and 1°—11'—30" equals 15° or one hour in time between observations which indicates the latitude 30° is correct. When the triangular member is revolved and the pointer shows the latitude, the upper leading edge of the triangular member should show on the outer circle the latitude also. In this case 30° latitude plus declination 23°—26'=53°—26' should show on circle at the straight edge of the triangular member; if the declination is north 30° less 23°—26'=6°—34'. When the apparent time is found by observations of the sun and subtracted from Greenwich apparent time, it equals the longitude. Of any other body, the hour angle is obtained and the right ascension of body and the right ascension mean sum applied to that hour angle and subtracted from Greenwich time to get the longitude.

The time of the foregoing first observation is determined by the process in Example 1: The position of the vessel was in latitude 29° 45' at the time the first observation was made, and the course of the vessel being assumed to be NE. it gained in latitude so as to be 30°. Therefore, the correction of the altitude 22° 10' 50" brought from 29° 45' and corrected to 30° latitude made the foregoing altitude to fall to 22° altitude. This is proved as follows:

```
29—45 lat.
23—26
―――――                         90
53—11 N. hav sin = .20037   Alt. 22—10—50
                            ―――――――――――――
                            67—49—10 co alt nat hav sin =
                                                           .31123
                                                           .20037
                                                           ――――――
                                            9.04476 = .11086 NHS
                                                      .09876
                                                      ――――――
                                            9.14352 LHS = 2—55—14

Log sec 29—45 = .06138
           Log sec 23—26 = .03738
                           ―――――
                           .09876
Now 22° alt at 30° lat and 23—26 dec = 2—55—14

30      = .06247 ⎫ log secs   90
           23  26  = .03738 ⎬ alt        22
                    ――――――
           53  26   .09985   co alt—68 nat hav sin = .31270
           n hav sin equals .20212 .................  .20212
                                                      ――――――
                            Log hav sin 9.04368 = nat HS .11058
                                                         .09985
                                                         ――――――
                                                  Hrs. Min. Sec.
                            Log H. sin  9.14343 = 2   55   14
```

The time of the second observation is determined by the process in Example 2:

```
Now  90  00  00
Alt  12  16  45
```

Coalt 77—43—15 nat hav sin = .39364
.20212  log hav sin

Nat H.S. of .19152 = 9.28221
.09985

Hrs. Min. Sec.
Log H. sin 9.38206 equals 3—55—13

```
    30  lat
23  26  dec 53  26  N.H.S. = .20212
```

The significance of 30° is the latitude at 2nd observation. The instrument in Figure 2 shows 1 point from the zenith at an angle of 88°—48'—30" and the other point on the inside declination circle shows an angle from the zenith of 73—48—30 and this subtracted from 88°—48'—30" leaves a remainder of 15°=1 hr. the interval of observation and also 30° the latitude subtracted from each.

```
      88  48  30              73  48  30
      30  00  00              30  00  00
  15) 58  48  30 lat at    15) 43  48  30 lat at
          neutral position        neutral position
       3  52                   2  52
           3  14                   3  14
       3  55  14              2  55  14
```

Respective hour angle north 30° lat and 23°—26' dec south.

Figure 4:
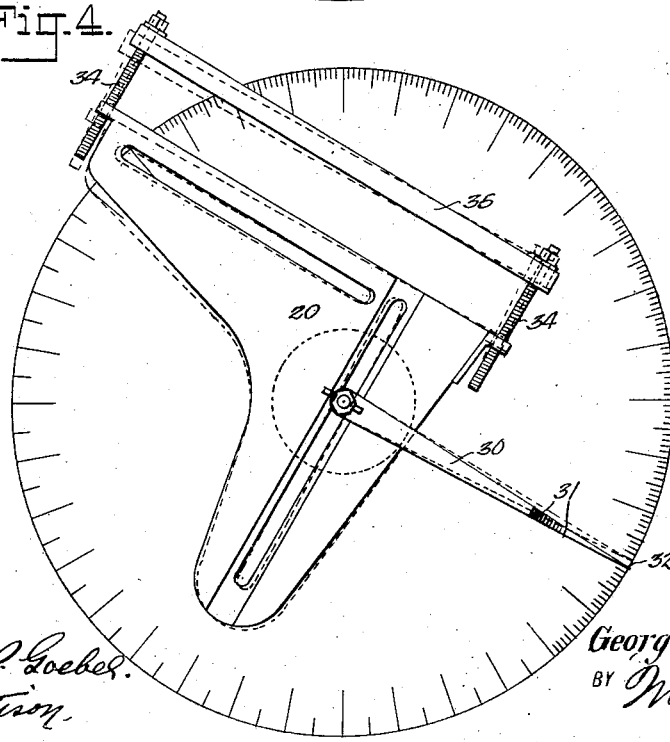
Fig. 4 is a similar view showing the parts in a different position.

The bar 35, described in connection with Figures 3 and 4, is used under the following circumstance: Upon making the foregoing first observation of the sun or other heavenly body off the meridian, record of the same and note of Greenwich mean time are made simultaneously. Upon taking the second observation, say 1 hr. later, record is again made of the same with Greenwich mean time. The intervals of time between observations obviously may be more or less than one hour. The two observations taken with the sextant are corrected for refraction, etc. and are then scribed lightly on a graduated sheet 19 as shown in Figure 2.

The instrument is now placed as in Figure 3. The edge 22 of the triangular member 20 is set parallel and even with one of the altitudes laid off on the graduated sheet (see altitude 22° 10' 50" of the first observation in Figure 2). The screws 34 permit of adjustment of the space between the inner edge or face of the bar 35 and the edge 22 of the triangular member so that the desired registration with various altitude lines scribed upon the sheet 29 may be had.

The jam nuts, with which the screws 34 are equipped are then tightened so that the space or opening for the altitudes on the sheet cannot change position when the triangular member is shifted upon its pivot. Now place the pointer 30 at 0 at any convenient place as at Figure 3. The thumb screw 29 must be loosened to permit adjusting the triangular member until the confronting inner edge of the bar 35 and the edge 22 coincide with the altitude lines. When the instrument is turned to the right the openings between the bar 35 and the member 30 assume an angle with respect to the declination vertical line as in Figure 4, and the pointer 30 will indicate the degrees and minutes of arcs of turning movement representing the angle moved.

You assume the latitude and turn the triangular member 20 until the pointer 30 indicates that latitude. Now with a sharp pointed pencil scribe the two intersections of the confronting inner edges of 35 and 20 with the declination vertical line. These two points of intersection are squared or projected over to the inner circle (see Fig. 5). The triangular member 20 is now removed and the pin 56 (Fig. 8) put in place in the bushing 12.

Place the edge of a straight edge at the center and through each point on the inner circle. The degrees and minutes of declination from the zenith are recorded on the outer circle, and these degrees and minutes of arcs divided by 15 will give the local time of observation. If the observations are made on shipboard, and the vessel changes position after the first observation, say 10 or 15 miles of latitude before scribing the last observation across the declination line, move the triangular member to an extent to agree with the change of latitude recorded by the officer on watch and then scribe the line across the declination line and project or square it over to the inner circle.

Now if the interval of time between the two observations was 1 hour this would equal 15° that the points mentioned before as having been squared over to the inner circle must record for the local time, the pointer 30 at the same time indicating 15° which represents the latitude. If the foregoing assumed latitude gave only 12° instead of the required 15° it is only necessary to keep on rotating the triangular member 20 until 15° is had on the inner circle. The pointer will then indicate the latitude.

Use is also made of the clips 60 (Fig. 2). These are made of spring brass or other suitable material, of such construction that they can be sprung open by the finger and thumb and placed upon that portion of the member 20 adjoining the edge 22. The adjustment of the clips is as follows:

If the declination is 23° 26′ an inner circle is scribed upon the sheet 19 in concentric relationship with the outer circle, and of a radius equal to the scribed vertical line of declination 23° 26′ (see Fig. 5). After scribing this circle the hour angle is laid off as follows: Say 4 hours × 15°=60° from the zenith either to the right or left depending on whether the declination is positive or negative. From the 60° division a line is drawn to the center of the graduated sheet and as this line crosses the declination circle the spot where the intersection occurs is marked. This spot or point (see Fig. 5) is projected or squared over to the vertical declination line as seen at points C and D, respectively representing three and four hours.

Now the two clips, mentioned before, are placed at these points, the member 20 first having been moved until the edge 22 is parallel with the vertical declination line. If the member 20 is now rotated to the left and the points marked by the clips are made to intersect the two altitude lines at one and the same time the pointer 30 will indicate the desired altitude.

If the clips do not touch the lines at one and the same time, the hour angles 3 and 4 are changed for other hour angles and the member 20 is rotated more or less by trial and error until the hour angles and altitude lines do agree, whereupon the pointer will indicate the latitude. No matter what latitude the position of the ship may be at the time of observation laid down and the interval of time taken into consideration, it is a matter of fact that the proper location will be at hand when the instrument is turned to its proper position or angle. The adjustable feature of the two clips as brought out in the foregoing description makes it apparent that no scale upon the member 20 is required in order to guide the adjustment.

Reference is made to Figure 5. The templet shown is simply a piece of Bristol board with with a suitable pivot upon which it may revolve when moved to the right or left by the operator. As the inner circle of the declination is struck on this templet (see the arc at the extremity of the templet) and the two points or corners at the arcs are 15° apart, the templet may be moved around by the operator until the angle that bisects the altitude lines when projected or squared over from the vertical declination line coincides with the foregoing 15° points or corners on the templet. The latitude reading is thus secured and if the latitude is subtracted from the readings thus secured and from the zenith the hour angles are obtained as in the preceding example. The templet merely aids to speed the operation.

What is claimed is:

1. A nautical instrument comprising in combination, a board, a substantially triangular member, means for pivotally and slidably mounting said triangular member on the surface of said board, and a pointer pivotally carried by said means.

2. A position determining instrument comprising in combination, a board having a bushing bearing therein and bearing a writing surface having a graduated circle thereon whose center coincides with the lonitudinal center of said bushing bearing, a substantially triangular member adapted for movement over said writing surface, means for pivotally mounting said triangular member on said board, said means comprising a pin adapted to fit in said bushing bearing, and a pointer adjustably carried by said means and having its free end adapted to indicate over the graduations of said graduated circle.

3. A position determining instrument comprising in combination, a board, a substantially triangular member, means mounting the member on the board for pivotal sliding movement thereover, a pointer carried by said means, and a bar carried by said triangular member and spaced with respect to one of the side edges thereof in the plane of said member.

4. A position determining instrument comprising in combination, a board, a substantially triangular member, means mounting the member on the board for pivotal sliding movement thereover, a pointer carried by said means, and a bar spaced with respect to one of the side edges of the triangular member and adjustable in the plane of said member and with respect thereto.

5. A position determining instrument comprising in combination, a board, a substantially triangular member, means mounting the member on the board for pivotal sliding movement thereover, a pointer carried by said means, and a bar spaced with respect to one of the side edges of the triangular member and capable of angular adjustment in the plane of said member and with respect to the side edge from which it is spaced.

6. A position determining instrument comprising in combination, a board, a substantially triangular member, means upon which said member is mounted for sliding and pivotal movement over one surface of said board and provided with a plurality of elongated slots, said elongated slots being positioned at right angles to each other and one of said slots receiving said means, a pointer mounted upon said means for adjustment over said board, and a plurality of resilient clips mounted for adjustment longitudinally of the other of said elongated slots.

7. A position determining instrument comprising in combination, a board, a substantially triangular member having one straight side, means upon which said triangular member is mounted for sliding and pivotal movement with respect to one surface of said board, a bearing mounted at each end of the straight side of said triangular member, and a bar mounted in said bearings and adjustable with respect to the straight edge of the triangular member.

8. A position determining instrument comprising in combination, a board having a bushing bearing therein and bearing a writing surface having a graduated circle thereon whose center coincides with the longitudinal axis of said bushing bearing, a substantially triangular member adapted for movement over said writing surface and having a longitudinal slot in its base, means for pivotally mounting said triangular member on said board, said means comprising a pin passing through the slot in the triangular member and engaging said bushing bearing whereby a sliding movement of said triangular member relative to said writing surface is permitted, and a pointer adjustably carried by said pivot means for indicating over the graduations of said graduated circle.

GEORGE KOFFSKEY.